United States Patent [19]

Schubin et al.

[11] 3,936,594

[45] Feb. 3, 1976

[54] SECURE TELEVISION SYSTEM

[75] Inventors: Mark Schubin, Hoboken; George Andersen, Dumont, both of N.J.

[73] Assignee: Lincoln Center for the Performing Arts, Inc., New York, N.Y.

[22] Filed: Aug. 5, 1974

[21] Appl. No.: 494,819

[52] U.S. Cl. .............. 178/5.1; 178/5.6; 179/15 BT; 325/308
[51] Int. Cl.² ......................................... H04N 1/44
[58] Field of Search .............. 178/5.1, 5.6, DIG. 13; 325/308; 179/15 BT

[56] References Cited
UNITED STATES PATENTS

| | | | |
|---|---|---|---|
| 3,046,329 | 7/1962 | Reesor | 179/15 BT |
| 3,388,214 | 6/1968 | Eilers et al. | 179/15 BT |
| 3,860,873 | 1/1975 | Ringstad | 325/308 |

OTHER PUBLICATIONS

Halstead et al., Journal of Audio Engineering Soc., 1-1962, Vol. 10, No. 1, pp. 16–22.
Numaguchi et al., NHK Laboratories Note, No. 132, 2-1970, pp. 2–29.

Primary Examiner—Maynard R. Wilbur
Assistant Examiner—S. C. Buczinski

[57] ABSTRACT

A secure system for television transmission wherein a television signal is transmitted on one frequency channel and a composite high fidelity stereophonic audio signal is transmitted on a separate unrelated frequency channel. Unauthorized reception of the audio portion of the signal is prevented by using non-standard multiplex transmission and by transmitting the audio signal in a frequency band which is preferably non-receivable by a standard television or FM receiver.

5 Claims, 5 Drawing Figures

SECURE TELEVISION SYSTEM

The invention relates to television systems for simultaneous transmission of video and audio signals and particularly to television systems in which security in reception is required in connection with reception of the audio signals. The invention is particularly useful for high fidelity audio programs transmitted over a cable television system.

There are two systems currently in use for transmission for reception of television programs in the home. In the more common type system, programs are transmitted from a broadcast station through the air for reception by any television receiver within the broadcast range of the transmitter. The second type of system is Community Antenna Television or CATV, commonly referred to as cable television. In the earliest CATV systems, a master antenna was erected at a location where ordinary television broadcast television signals could be received. A coaxial cable connected the master antenna and signal processing systems with the television receiver of each subscriber to the system to bring the television broadcasts to these receivers which could not otherwise receive such broadcasts.

Once CATV systems were established, it was recognized that these systems could provide programs in addition to those shown on the usual broadcast stations. These programs could be provided as part of the usual service to the subscriber to a CATV system or as special programs for which an additional payment by the viewer would be required. These programs would also make cable television systems attractive for viewers in those areas where television broadcasts can be received with high quality without the aid of the cable system.

Providing these services over a CATV system is not without problems. First, the audio portion of the conventional television signal normally is transmitted as a relatively narrow band frequency modulated signal. This audio signal, which is of markedly inferior quality, particularly when compared to the audio signals to which the public has become accustomed through the widespread acceptance of high fidelity stereophonic FM broadcasts, is particularly disadvantageous for television transmission of musical programs such as concerts, operas or the like. Secondly, in certain circumstances, it is required that the reception of these special programs be restricted to only those television viewers who subscribe to the special program and pay the extra fee for receiving the broadcasts.

Accordingly, it is an object of this invention to provide a television system which has a high quality video and audio signal. It is a further object of the invention to provide a method for transmission and reception of high fidelity stereophonically related audio signals with a video signal in a television system which increases the viewing enjoyment of the television viewer.

It is a still further object of the invention to provide such a system on a secure basis, and particularly to prevent unauthorized reception of the audio portion of the transmitted signals.

It is an additional object of the invention, to provide such a system at the lowest possible cost while still maintaining the highest possible quality of reception.

In providing such a television system, advantage can be taken of the regulations of the Federal Communications Commmssion which establish standards for transmission and reception of television and stereo multiplex signals. One consequence of the imposition of these standards is that substantially all television and stereophonic receivers are made to receive the standard transmission. Therefore, a non-standard television and stereophonic audio signal is provided in accordance with this invention which requires specially designed receivers for reception. This system has the characteristics of high quality video and high fidelity stereophonic audio transmission and reception; is designed to prevent unauthorized reception of the audio portion of the signal and has a relatively low cost.

Prior to fully discussing the non-standard transmission utilized in the invention, it will be helpful to the understanding of the invention to set forth the television and stereo multiplex standards established by the Federal Communications Commission so that the differences between the standard transmission and the transmission and reception system of the disclosed invention can be fully understood.

Standards for television broadcasting require that television transmission occur in allocated frequency ranges in the frequency spectrum. In a lower frequency range, or VHF, transmission allocation of the frequency bands are as follows: 54–72 megahertz (Mhz) (channels 2–4); 76–88 Mhz, (channels 5 and 6); and 174–216 Mhz (channels 7–13). The upper frequency range, UHF, extends between 470 and 890 Mhz for transmission of channels 14–83.

Each television channel is allocated a channel with a frequency band width of 6 Mhz, within which a composite video and audio signal is transmitted. The video portion is transmitted as signals amplitude modulating a carrier wave and occupying 5.5 Mhz of the band width, while the audio portion is transmitted in a 50 kilohertz (Khz) band as a frequency modulated signal on a carrier wave of a frequency 4.5 Mhz above the center carrier frequency of the video signal. This composite signal is transmitted and detected by a television receiver tuned to the channel. In the receiver, the audio and video portions of the composite television signal are separated and detected.

In the standard stereo multiplex transmission signal, two audio signals from two separate audio sources (left and right) are combined to produce sum and difference combination audio signals. The sum combination signals occupy the lower portion of the frequency spectrum of the signal and extend generally between 0 and 15 Khz. The difference combination signals are applied to amplitude modulate a carrier wave at a frequency of 38 Khz to produce a suppressed carrier double sideband amplitude modulated signal extending in the frequency range between 23–53 Khz. A pilot signal at 19 Khz is also transmitted for the purposes of synchronization. The three signals frequency modulate a carrier wave at a frequency between 88-108 Mhz which is then transmitted. In a typical receiver, the composite signal is detected and demodulated and the pilot signal is used to control a decoder which separates the combined audio signals into the individual left and right audio signals which are applied to separate loudspeakers.

In accordance with an illustrative example of the invention, a transmitter provides a non-standard composite audio and television signal for transmission over a cable to a subscriber's receiver. The transmitter includes means for providing a standard television signal on a TV channel including a video portion and unmodulated audio portion for noise prevention in the receiver, and means for providing stereophonically related audio signals on a separate unrelated audio channel separated in frequency from the television channel so that a conventional television receiver cannot be tuned to detect both the audio and the video signal and a conventional radio receiver cannot detect the audio signal.

For the audio transmission, left and right audio signals are combined to produce sum and difference combination audio signals. The sum combination signal is applied to amplitude modulate a subcarrier wave which has a frequency at least twice that of the highest frequency of the difference combination of signals to produce sum combination sidebands in such manner that the subcarrier wave is suppressed. A pilot carrier at a frequency related to the frequency of the subcarrier wave and preferably in the range between the lowest frequency of the sum combination sideband signal and the highest frequency of the difference combination signal is also provided. The difference combination audio signal, the pilot signal and the sum combination sideband signals, are applied to frequency modulate a carrier wave which has a frequency which lies preferably outside the frequency band 88-108 Mhz to produce a composite FM multiplex stereophonic signal. The composite stereophonic signal is applied along with the television signal to the cable for transmission to the subscriber.

At the receiver, means are provided for separating the composite audio signal from television signals. The remaining signal is then applied to conventional television receivers or CATV converters for producing the television picture in the usual manner. The receiver also includes input means coupled to receive the composite audio signal and tuned to its single frequency for converting the composite audio signal into a signal in a predetermined I.F. frequency band. The I.F. signal is coupled to an FM detector and then decoded in a stereo decoder, under the control of the pilot signal, to produce the left and right audio signals.

Other and further advantages, objects and features of the invention will become apparent to those skilled in the art from a reading of the following detailed description of a preferred embodiment of the invention when taken in light of the accompanying drawings in which.

To insure uniformity and prevent interference in the transmission of television and radio broadcast signals through the air and on cables the Federal Communications Commission has the responsibility of establishing standards, fixing the frequency bands in which various types of signals can be transmitted and the composition of such signals. As a consequence of the establishing of such standards, substantially all television and radio receivers manufactured for use by the general public are built to receive the FCC standard broadcast signals. Pursuant to this responsibility, the FCC has allocated the frequency bands: 54-72 Mhz; 76-88 Mhz; and 174-216 Mhz; 470-890 Mhz for broadcast television transmission. Each of these frequency bands is divided into channels, having a bandwidth of 6 Mhz, and on each of these channels is broadcast a standard video and audio signal.

Figure 1:
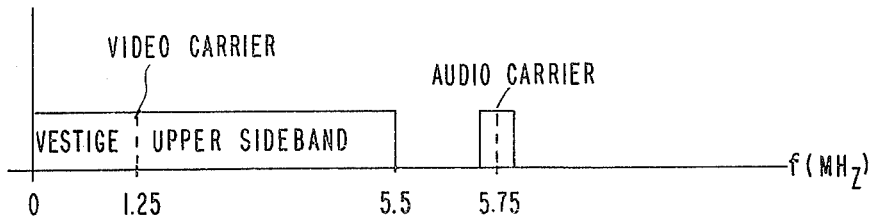
FIG. 1 is a graphical representation of the FCC required signal transmitted on a standard television channel.

FIG. 1 is a graphical representation of a standard television broadcast signal for transmission over one of the broadcast channels. In the lower frequency range, extending between 0 and 5.5 Mhz, the video signal is transmitted by amplitude modulation of a carrier wave at 1.25 Mhz above the lowest frequency in the channel. The entire upper sideband and part of the lower sideband produced in the modulation process are transmitted as an amplitude modulated (vestigial sideband) signal. The audio portion of the signal is transmitted by frequency modulation of a carrier wave at a frequency 4.5 Mhz above the center video carrier frequency. The audio signal band width is 50 Khz. This television signal is transmitted through the air for reception by all television receivers within the transmission range of the transmitter. The standard television receiver is tuned to receive this television signal by setting a single dial to a selected channel. The receiver then detects both the audio and video portions of the signal transmitted on that channel.

Figure 2:
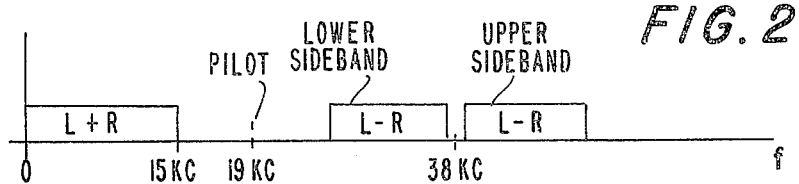
FIG. 2 is a graphical representation of one channel of the FCC required FM stereo multiplex signal.

The FCC has allocated the frequencies between 88 and 108 Mhz as the standard FM broadcast frequency band, and divided this band into frequency channels having 200 Khz bandwidth; with each broadcasting station allocated one of the frequency channels for broadcasting. Within each frequency band the FCC has standardized the FM stereo multiplex broadcast signal. Referring to FIG. 2, which shows graphically the standard FM stereo multiplex composite signal, two audio signals, L and R from two audio sources are combined in sum (L+R) and difference (L−R) signals. The L+R signal is transmitted on a main channel extending between 0 and 15 Khz where zero indicates center frequency. The L−R signal amplitude modulates a 38 Khz subcarrier wave to produce a double sideband suppressed carrier L−R amplitude modulated signal. A pilot signal at 19 Khz is included to provide synchronization for decoding the signal. This composite signal is broadcast at one of the allocated frequencies in the FM band. The standard FM stereo multiplex receiver is designed to be tuned to a selected station in the allocated FM frequency band and when tuned to such selected station, to detect and decode this standard FM stereo multiplex signal.

Provision for a secure television broadcast system for transmission of video and stereophonically related audio signals for reception only by authorized receivers is carried out according to the present invention by establishment of an FM stereo multiplex audio signal which differs from the FCC authorized signal. This nonstandard signal is such that if an ordinary television receiver is tuned to the channel on which the signal is transmitted, the television receiver will detect only the standard television signal transmitted, with no sound and a standard FM or FM stereo multiplex receiver will detect a signal which is substantially unintelligible to the listener. In this way, only those who subscirbe to the program transmitted over the cable system will be able to receive and enjoy the program. This system is particularly advantageous for transmission of musical events where quality of the audio portion of the signal is very important.

Figure 3:
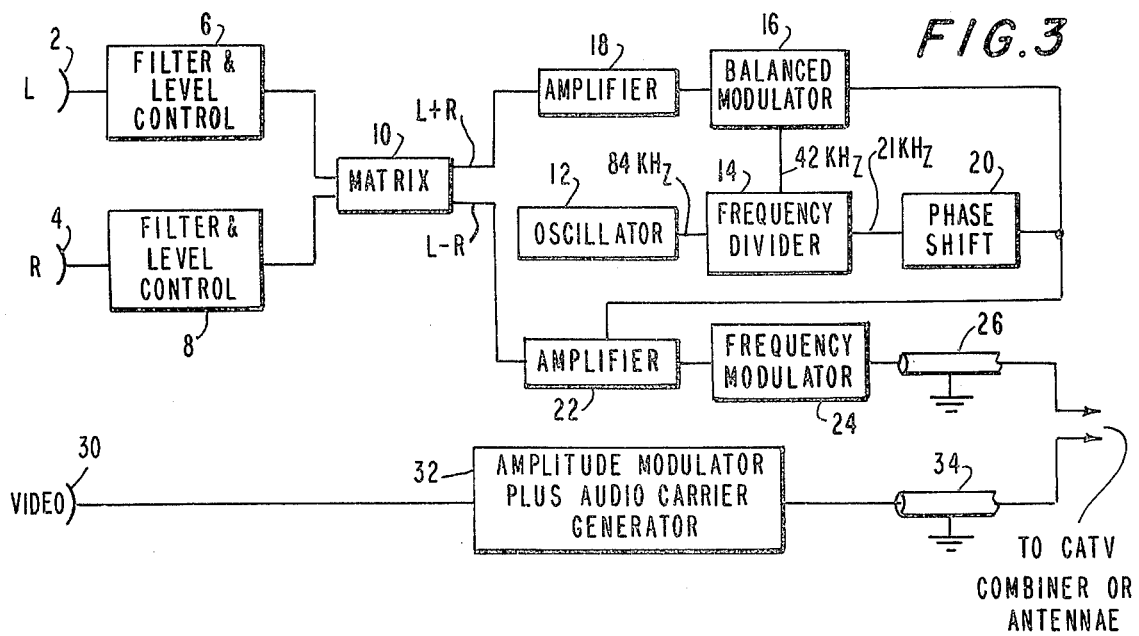
FIG. 3 is a diagramatic representation, in block diagram form, of a transmitter for transmitting television and FM signals in accordance with this invention.

Reference is now made to FIG. 3 which shows in block diagram form one example of a television transmitter embodying the principles of the present invention and particularly for a CATV system. To provide the non-standard FM stereo multiplex signals, two sources of audio frequency signals L and R, are applied via left audio source, 2, and right audio source, 4, to low pass filters and level controls 6 and 8 respectively, which are designed to pass frequencies between 0 and 15 khz. The left and right audio signals from filters 6 and 8 are applied to matrix 10 which provides, in a well-known manner, the sum combination of signals, (L+R) at one output, and the difference combination of signals, (L−R), at the other output.

The non-standard stereo audio signal of the present invention has the (L−R) difference combination signal transmitted on a main channel extending between zero and 15 Khz and the (L+R) sum combination audio signal translated upward in frequency to a portion of the frequency spectrum not occupied by the (L−R) signal. To translate the frequency range of the (L+R) signal, the (L+R) output of matrix 10 is applied to amplitude modulate a subcarrier wave in a manner to be explained. The subcarrier can be at any frequency other than the standard 38 Khz signal used to broadcast standard FM stereo multiplex programs (unless the pilot carrier frequency is other than 19 kHz in which case a subcarrier of 38 kHz is acceptable), and is at least twice the frequency of the highest frequency component of the (L−R) signal. In the illustrative example described herein, the subcarrier frequency is selected to be at 42 Khz.

The 42 Khz subcarrier wave is supplied from an 84 Khz oscillator, 12, frequency divider 14 to balance amplitude modulator 16. The other input to the balanced modulator is the (L+R) audio signal which is applied via amplifier 18. As is well-known to those skilled in the art, the output of the balanced modulator is upper and lower sidebands containing the (L+R) audio signals but not containing the subcarrier itself. A pilot wave is required to recover the audio portion of the signal. The pilot wave frequency is preferably one-half the frequency of the suppressed subcarrier wave, and for the example illustrated herein, is 21 Khz. The frequency of the pilot wave can be related to the subcarrier wave frequency in any manner; for example, a pilot wave of 19 Khz can be used with a subcarrier wave of 57 Khz, being three times greater in frequency. The pilot wave is provided from a second output from frequency divider 14 which is one-quarter the frequency of the signal from oscillator 12. The pilot signal is applied to phase shift network 20 to equalize the phase of the 21 Khz pilot and the 42 Khz suppressed subcarrier.

The (L−R) audio signal from matrix 10, the double sideband suppressed carrier amplitude modulated (L+R) signal from balance modulator 16, and the pilot signal, via phase shift network 20, are applied, via amplifier 22, to frequency modulator 24 wherein all three signals frequency modulate a carrier wave as is well-known in the art. The frequency of the FM carrier wave is preferably chosen to be in a frequency band other than 88–108 Mhz, the usual FM band, and preferably at a frequency where there is no broadcasting or cablecasting. One such band is 72–76 Mhz, between two frequency bands allocated for television transmission, which has little cable transmission. As an example, 73 Mhz is used for the frequency of the FM carrier wave. The frequency modulated signal from frequency modulator 24 is applied to coaxial cable 26 for transmission over the cable to the subscriber's receiver.

The television portion of the transmission is derived from a video source 30 and applied to a television modulator 32 to produce a vestigial sideband amplitude modulated video signal and audio carrier as is well-known in the art. The audio carrier can also be modulated with non-program related information for use as a "barker" channel, or for other uses as is known in the art. This video signal is provided in accordance with the illustrative example in any available standard or non-standard television frequency channel. As an example, a video carrier of 61.25 Mhz (channel 3) is used. The output of modulator 32 is applied to coaxial cable 34 and the outputs of cables 26 and 34 are combined for transmission to cable 36 for reception by authorized receivers.

It is thus clear that a subscriber who has only a conventional television receiver or conventional FM or FM stereo multiplex receive cannot receive the entire program transmitted via the cable. With a standard television receiver tuned to the channel over which the video signal is transmitted, only the video portion is received since there is no sound transmitted on that channel. Of course, the frequency band for the video signal could be changed or the signal scrambled so that the video signal could not be received on a standard television receiver. The standard FM or FM stereo multiplex receiver would not receive any portion of the audio signal since the standard receiver can only detect signals transmitted in the range between 88 and 108 Mhz. An FM receiver modified to receive an FM signal transmitted in the frequency range between 72 and 76 Mhz would not detect an intelligible signal since the (L−R) signal on the main channel is not, by itself, intelligible and the receiver could not decode the (L+R) sideband signals since a 19 Khz standard pilot signal in conjunction with a 38 kHz subcarrier frequency is not used. Thus, as illustrated in the example, a signal is produced which can only be fully detected on receivers which are specifically designed to detect the non-standard transmission. In this way, the system insures that only authorized receivers will fully receive a program. A block diagram of such a receiver is shown in FIG. 4.

Figure 4:
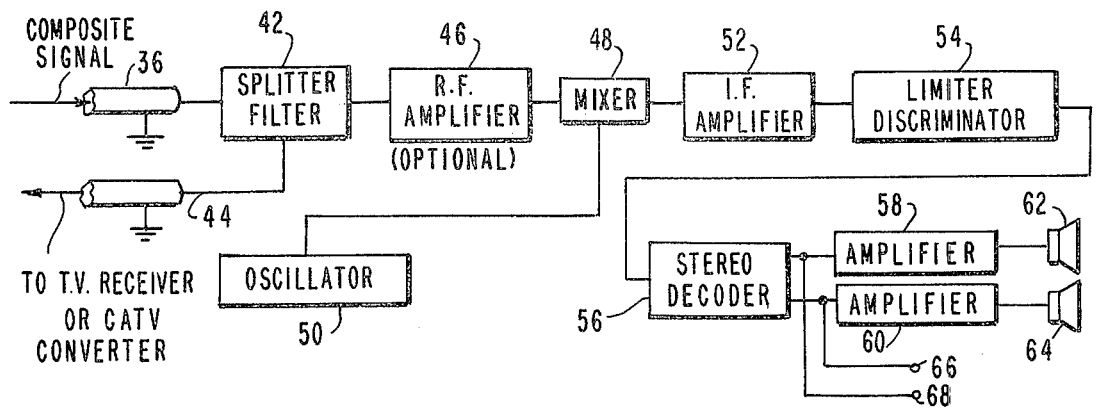
FIG. 4 is a diagramatic representation, in block form showing the receiver for detecting the audio signals transmitted in accordance with this invention, and passing the television signals to a conventional receiver.

Referring now to FIG. 4, the composite audio and television signal is fed via cable 36 to the receiver input which includes splitter/ filter 42. The splitter/filter includes band pass and band stop filters, as is well-known in the art, for separating two signals. Filters of this type are used to separate the FM band from TV in CATV systems. The television portion of the signal is fed, via coaxial cable 44 to a standard TV receiver or CATV converter which is well-known in the art and not shown in greater detail for purposes of brevity.

The audio portion of the signal is applied to R.F. amplifier 46 for amplifying the high frequency incoming signal. This amplifier is optional for CATV systems since CATV provides a high level signal. The high frequency signal is coupled to a mixer 48 whose other input, from oscillator 50, is a signal at a predetermined fixed frequency, preferably 10.7 Mhz, away from the frequency of the FM carrier wave. The two signals are mixed in mixer 48 and a signal at a predetermined intermediate frequency preferably 10.7 Mhz, is produced and applied to I.F. amplifier 52. The output of the I.F. amplifier 52 is fed to a combined limiter and discriminator. The output of discriminator 54 is the composite audio signal with the (L−R) signal in the frequency range zero to 15 khz; a pilot signal at 21 khz; and the (L+R) sideband signal amplitude modulated on a suppressed 42 khz subcarrier.

This composite signal is applied to a stereo decoder which can be arranged, as is well-known in the art, to separate the composite audio signals into the individual L and R audio signals under the control of the pilot signal. The left and right audio signals from decoder 56 are then applied via amplifiers 58, 60 to speakers 62, 64 which reproduce the stereophonic audio signals. Amplifiers 58, 60 and speakers 62, 64 can be part of the subscriber's own high fidelity equipment. For this arrangement, line jacks 66, 68 are provided on the stereo decoder for coupling the left and right signals to the amplifiers.

In this manner, only authorized subscribers equipped with a cable television receiver and the special audio receiver can receive a special program transmitted over the cable. The secure system is provided at relatively low cost and provides greater fidelity in broadcasting of audio signals.

Figure 5:
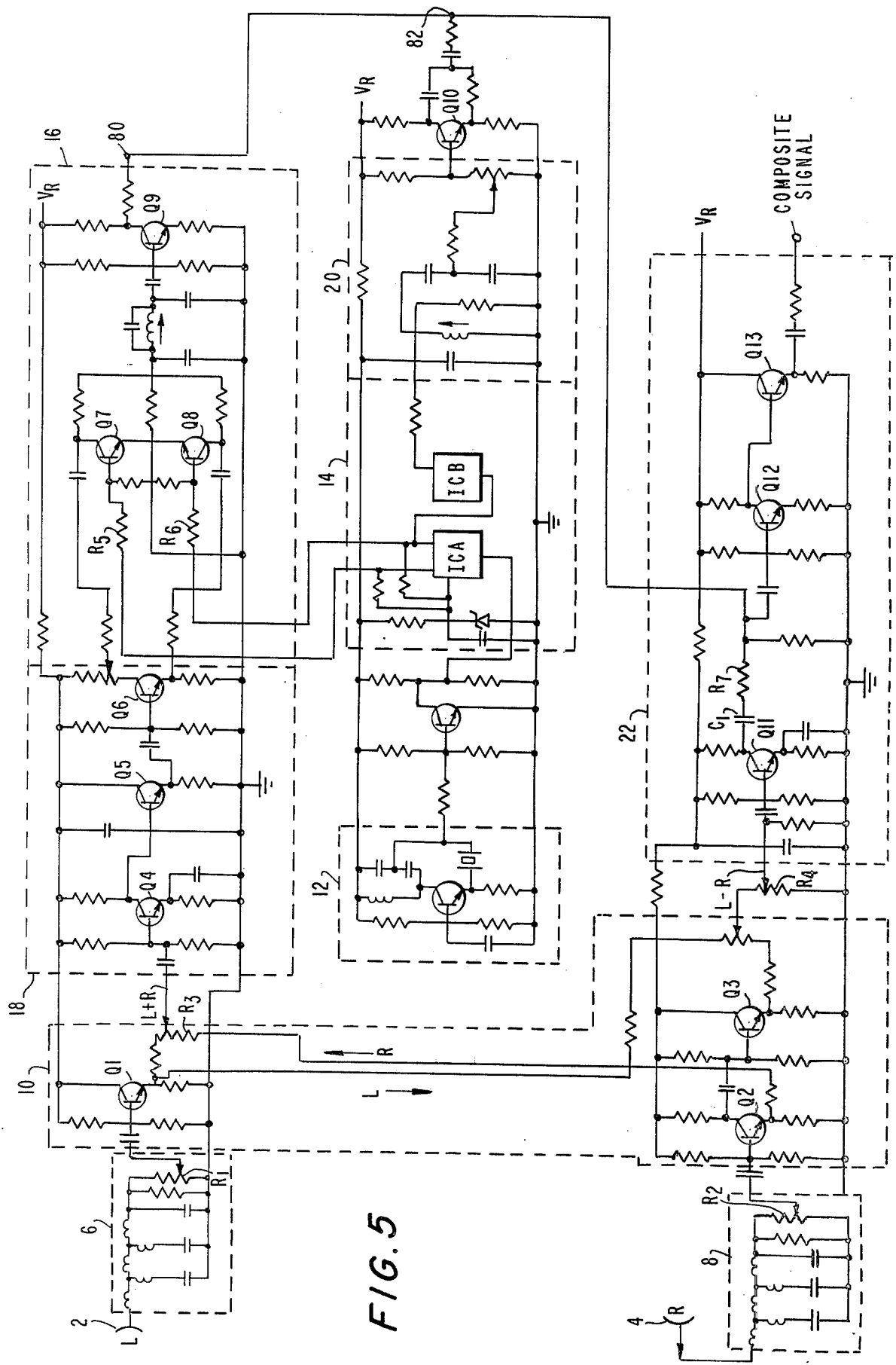
FIG. 5 is a partial circuit diagram of a transmitter showing the circuit for producing the audio signals in accordance with this invention.

Referring now to FIG. 5, there is shown a schematic circuit diagram of a portion of the transmitter of the present invention showing an illustrative example of a circuit for providing the composite audio signal in accordance with the invention. Portions of the circuit of FIG. 5 which correspond to like portions of FIG. 3 are indicated by common reference numerals. Since much of the detailed operation of this circuit will be readily apparent to those skilled in the art, some of the details have been omitted in the interest of brevity.

Left and right audio frequency signals are fed to low pass filters and level controls 6 and 8 which pass all frequencies below 15 khz. The outputs of each filter are coupled through level potentiometers R1 and R2 to matrix 10 which includes transistors Q1, Q2 and Q3 and provides the (L+R) and (L−R) sum and difference combination audio signals at resistors R3 and R4.

The (L+R) sum combination signal is coupled to amplifier 18 which includes transistors Q4–Q6, where the signal is amplified, and then from the emitter and collector circuits of Q6 to balanced AM modulator 16 having transistors Q7–Q9. The other input to the balanced modulator is derived from crystal controlled oscillator 12 which provides a signal at a frequency of 84 Khz to frequency divider 14. The frequency divider includes an integrated circuit containing two frequency dividers (JK flip$_{flops}$),IC$_A$, IC$_B$, which divide the incoming frequency by 1/2 to produce the 42 Khz subcarrier wave and by one-fourth to produce the 21 Khz pilot signal, as is well-known in the art. The 42 Khz subcarrier wave is coupled to resistors R5, R6 in the balanced modulator. It will be appreciated by those skilled in the art that the output of the balanced AM modulator, indicated at reference numeral 80 is the sum combination double sideband suppressed subcarrier amplitude modulated signal. The 21 Khz output from frequency divider IC$_B$ is coupled to phase shift network 20, amplified by transistor Q10, and is present at the circuit connection indicated by reference numeral 82.

The difference combination signal (L−R) is coupled to amplifier 22 which includes first stage transistor Q11 for amplifying the (L−R) signal. The amplified L−R signal is coupled through capacitor C1 and resistor R7 and applied, with the pilot signal and the sum combination sideband signal to the second stage of amplifier 22 including transistors Q12 and Q13.

The output of transistor Q13 is the composite audio signal including the difference combination signal in a low frequency band extending to 15 Khz; a pilot signal at 21 Khz; and a sum combination double sideband suppressed subcarrier amplitude modulated signal in the frequency band between 27 and 57 Khz. This composite signal is then applied to a frequency modulator where it frequency modulates a carrier wave to produce a high frequency signal for transmission over the cable to the subscriber's receiver.

What has just been described is one example of a secure television transmission and reception system and the system just described should not be taken to limit in any way the scope of the invention. Many modifications, variations, additions and deletions can be made without departing from the spirit and scope of the invention. Thus, at the receiver, the output from the stereo decoder can be fed into head phone jacks, amplifiers and speakers especially made for the system or to the subscriber's high fidelity equipment through jacks which automatically provide the one program reception and cut out the other types. Furthermore, a system can be provided to disable a subscriber's receiver if required.

What we claim is:

1. In a television transmission system, means for transmitting a television program including means for transmitting the video portion of the television program on a video channel and means for transmitting the audio portion of the television program stereophonically on a separate audio channel unrelated in frequency to said video channel, said audio channel transmission means including a first source of audio information and a second source of audio information, means for combining said first and second audio signals to produce a sum combination of said audio signals and a difference combination of said audio signals, means for deriving a subcarrier wave having a frequency which is at least twice as high as the highest frequencies in said audio signals, means for amplitude modulating said subcarrier wave with said sum combination of audio signals to produce sum combination signal sidebands in such manner that said subcarrier wave is suppressed, means for deriving a pilot carrier wave having a frequency related to the frequency of said subcarrier wave, the frequency of said pilot wave not at the frequency of 19 kHz, means for applying said difference combination of audio signals, said sum combination signal sidebands and said pilot signal to a frequency modulator so as to frequency modulate a carrier wave with said difference combination audio signal, said sum combination sideband signal and said pilot signal for transmission with the video portion of said television program.

2. In a television system for transmitting a television program including a video signal and a related audio signal, said video signal being transmitted on a television channel and said audio signal being transmitted as a composite stereophonically related first and second audio signal on a separate audio channel unrelated in frequency to said video channel, said composite stereophonically related audio signals including a lower frequency band including a difference combination of said first and second audio signals, an upper frequency band separated from said lower frequency band by a frequency gap, said upper frequency band including the sidebands of said sum combination of audio frequency signals amplitude modulated on a suppressed subcarrier wave of a given frequency, a pilot signal at a frequency other than 19 kHz related to said subcarrier frequency, said composite stereophonically related audio signals frequency modulating a carrier wave to produce an audio information signal, means for detecting said television and stereophonically related audio signals including means for producing an audio information signal separate from said video signals, means coupled to receive said audio information signal including input means tuned to a single frequency for converting said audio information signal into a signal in a predetermined frequency band, detector means coupled to receive said audio information signal in said predetermined frequency band for producing said composite audio signal therefrom and decoder means under the control of said pilot signal coupled to receive said composite signal for producing said first and second audio signals.

3. A television transmission system for transmitting a television program including a video signal and related audio signal comprising means for transmitting said video signals on a television channel and means for transmitting stereophonically related audio signals on a separate audio channel unrelated in frequency to said video channel, said audio channel transmission means including a first audio signal and a second audio signal, means for combining said first and second audio signals to produce a sum combination of said audio signals, and a difference combination of said audio signals, means for deriving a subcarrier wave having a frequency which is at least twice as high as the highest frequency of said difference combination of audio signals, means for producing a sum combination signal sideband in such manner that said subcarrier wave is suppressed, means for deriving a pilot wave having a frequency other than 19 kHz, means for applying said difference combination of audio signals, said sum combination signal sidebands and said pilot signal to a frequency modulator so as to frequency modulate a carrier wave with said difference combination audio signal, said sum combination sideband signal and said pilot signal for transmission with said television signal.

4. In a receiver circuit for deriving at least one of two stereophonically related audio signals from a composite transmission including a video signal on a television channel and an audio information signal related to said video signal but on a separate audio channel unrelated in frequency to the video channel, the audio information signal comprising a composite audio signal including a suppressed subcarrier at a given frequency amplitude modulated by a sum combination of said stereophonically related audio signals, a difference combination of said stereophonically related audio signals in a frequency band lower than the amplitude modulated signal and a pilot signal, means for separating said video signal and said audio information signal, means for converting said audio information signal into a signal in a predetermined frequency band, detector means coupled to receive said audio information signal in said predetermined frequency band for producing said composite audio signal therefrom and decoder means under the control of said pilot signal coupled for producing at least one of said stereophonically related audio signals from said composite audio signals.

5. A television system including a receiver for receiving a television program having a video signal and a related audio signal, said video signal occupying a television channel and said audio signal being situated on a separate audio channel unrelated in frequency to said video channel, said receiver including means for separating said audio information signals from said video signals, means coupled to receive said audio information signal including input means tuned to a single frequency for converting said audio information signal into a signal in a predetermined frequency band, detector means coupled to receive said audio information signal in said predetermined frequency band for producing said composite audio signal therefrom and decoder means under the control of said pilot signal coupled to receive said composite signal for producing said first and second audio signals.

* * * * *